(12) United States Patent
Shimada

(10) Patent No.: US 11,199,909 B2
(45) Date of Patent: Dec. 14, 2021

(54) NUMERICAL VALUE INPUT APPARATUS, CHARACTER INPUT APPARATUS

(71) Applicant: KYOCERA Document Solutions Inc., Osaka (JP)

(72) Inventor: Akira Shimada, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 17/055,592

(22) PCT Filed: Mar. 13, 2019

(86) PCT No.: PCT/JP2019/010129
§ 371 (c)(1),
(2) Date: Nov. 15, 2020

(87) PCT Pub. No.: WO2019/220756
PCT Pub. Date: Nov. 21, 2019

(65) Prior Publication Data
US 2021/0109604 A1    Apr. 15, 2021

(30) Foreign Application Priority Data
May 15, 2018  (JP) .............................. JP2018-093477

(51) Int. Cl.
*G06F 3/023* (2006.01)
(52) U.S. Cl.
CPC .................................. *G06F 3/023* (2013.01)

(58) Field of Classification Search
CPC ...... G06F 3/023; G06F 3/0484; G06F 3/0233; G06C 1/00; G09B 19/02
See application file for complete search history.

(56) References Cited

U.S. PATENT DOCUMENTS 6,712,614 B1* 3/2004 Henderson ....... B64D 11/06205
434/203
2002/0197590 A1* 12/2002 Gan ...................... G09B 19/02
434/203
2006/0251224 A1* 11/2006 Fukumizu ............... G06F 21/42
379/93.01

(Continued)

FOREIGN PATENT DOCUMENTS

JP    S63-251852 A   10/1988
JP    S63-273923 A   11/1988

(Continued)

*Primary Examiner* — Amit Chatly
(74) *Attorney, Agent, or Firm* — Hawaii Patent Sendees; Nathaniel K. Fedde; Kenton N. Fedde

(57) ABSTRACT

Provided is a numerical value input apparatus that includes: an operation input unit that expresses numerical values of a plurality of digits by providing a plurality of numerical value setting operation units for each digit; with each of the plurality of numerical value setting operation units being biased to a side that is an initial state; and also includes a signal generation unit that, in a case in which an input confirmation key provided separately from the numerical value setting operation units is operated, confirms a numerical value that reflects the state of the numerical value setting operation units for each digit when the input confirmation key is operated, and converts the numerical value into an electric signal.

7 Claims, 20 Drawing Sheets

(56) References Cited

U.S. PATENT DOCUMENTS

| | | | | |
|---|---|---|---|---|
| 2007/0166673 A1* | 7/2007 | Frieman | ............... | G06C 1/00 |
| | | | | 434/203 |
| 2008/0096169 A1* | 4/2008 | Kim | ............. | G09B 19/02 |
| | | | | 434/159 |
| 2011/0151417 A1* | 6/2011 | Long | ............... | G06F 3/0488 |
| | | | | 434/191 |
| 2017/0223201 A1* | 8/2017 | Ueno | ............ | H04N 1/00387 |
| 2017/0229039 A1* | 8/2017 | Yamauchi | ......... | G09B 19/025 |

FOREIGN PATENT DOCUMENTS

| JP | H03-233619 A | 10/1991 |
|---|---|---|
| JP | H05-087628 U | 11/1993 |
| JP | H06-086123 U | 12/1994 |
| JP | H07-210284 A | 8/1995 |
| JP | 2004-110115 A | 4/2004 |
| JP | 2012-059051 A | 3/2012 |

\* cited by examiner

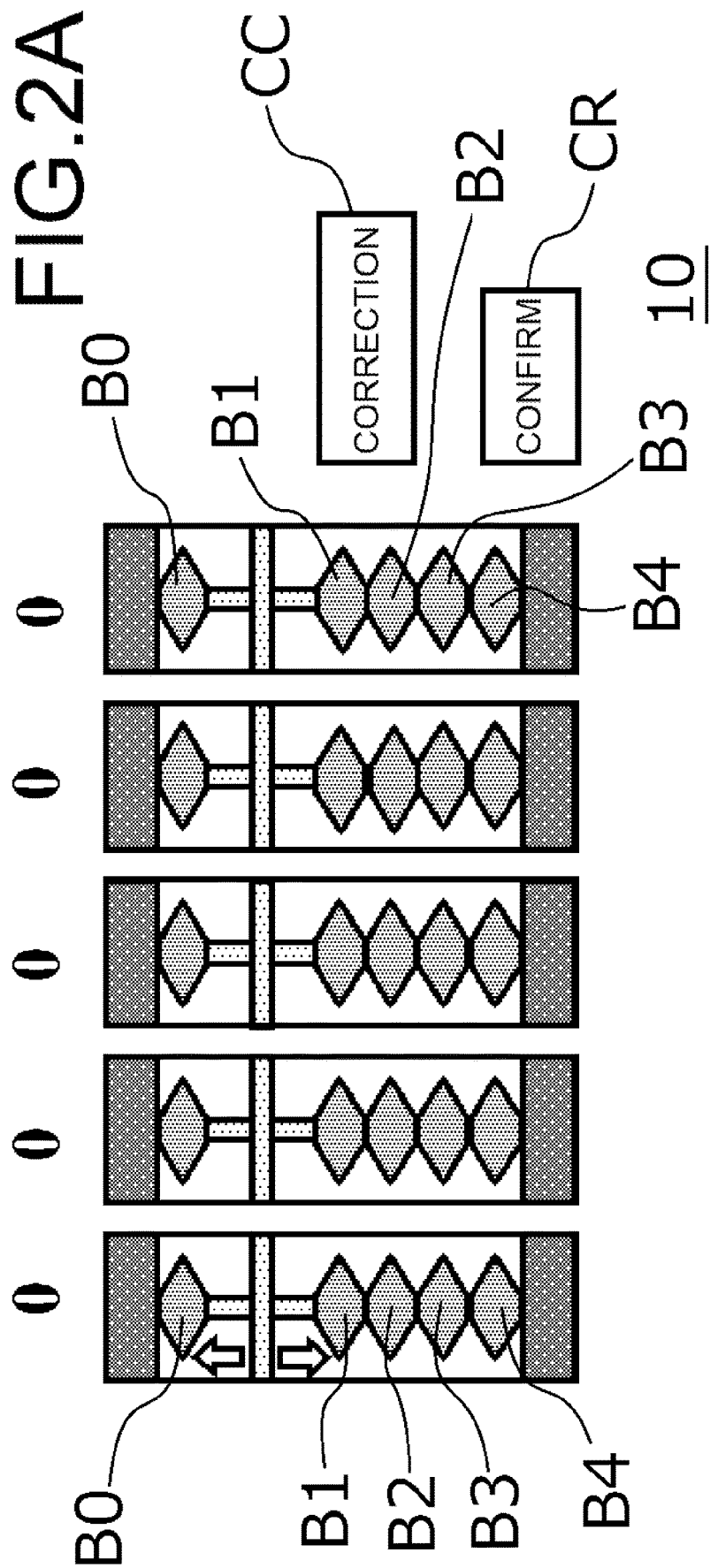

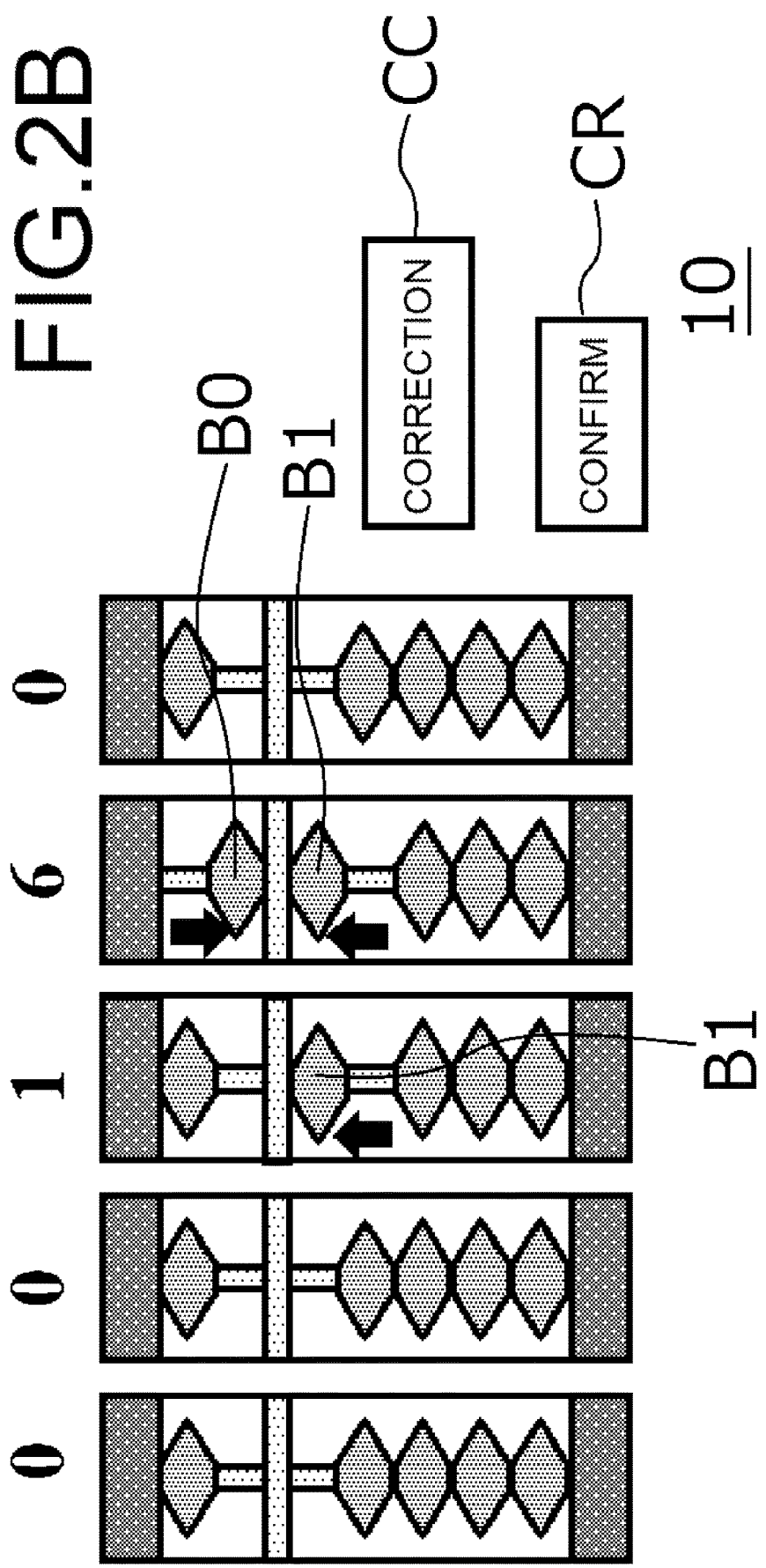

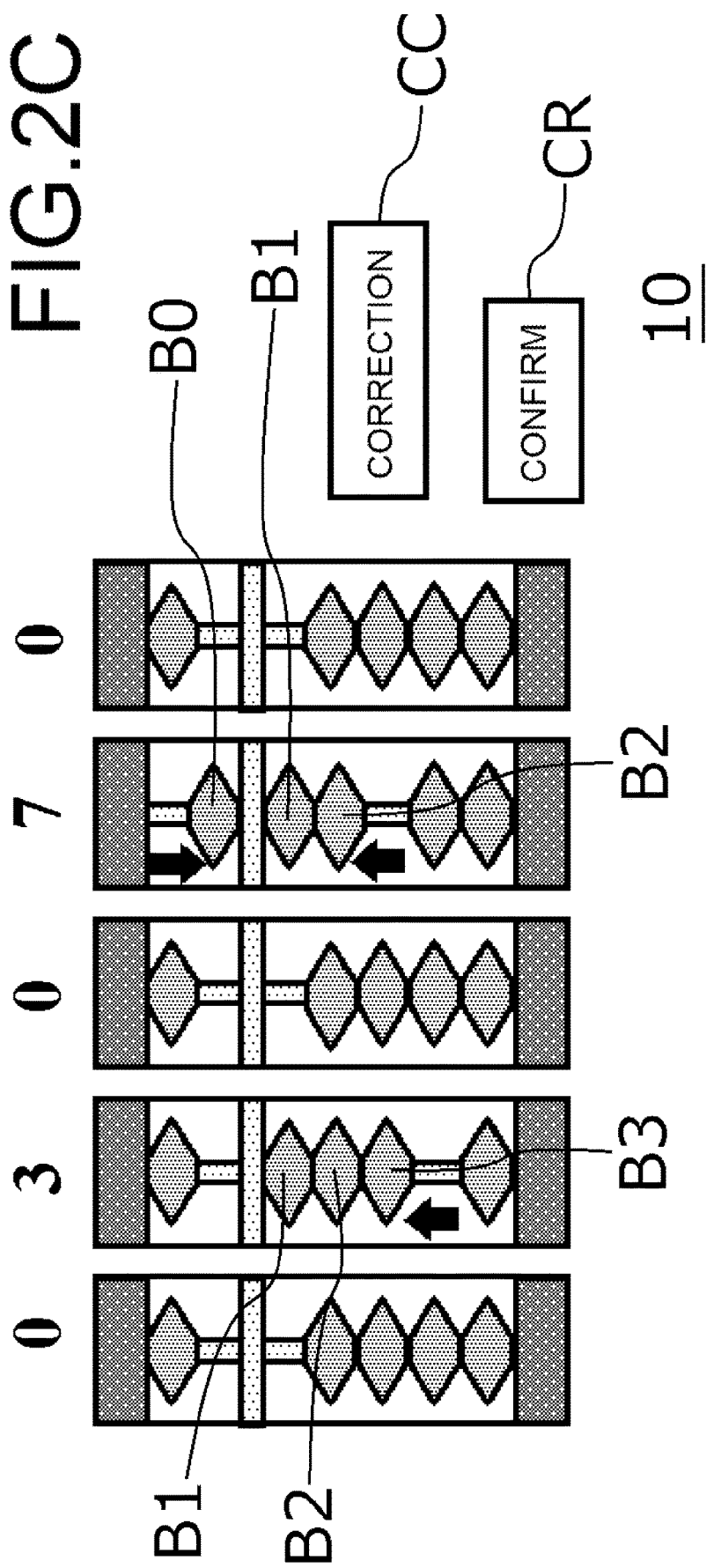

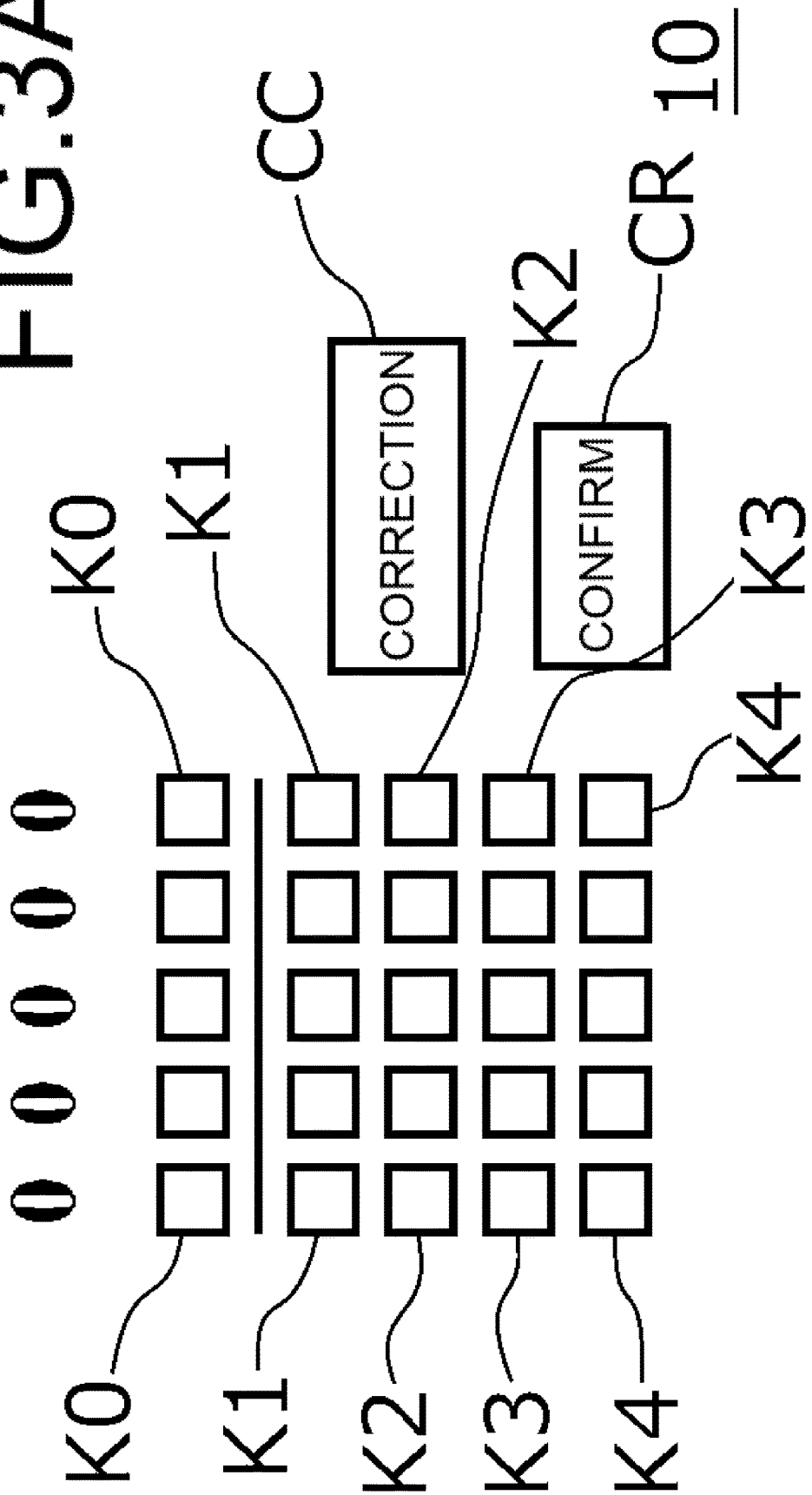

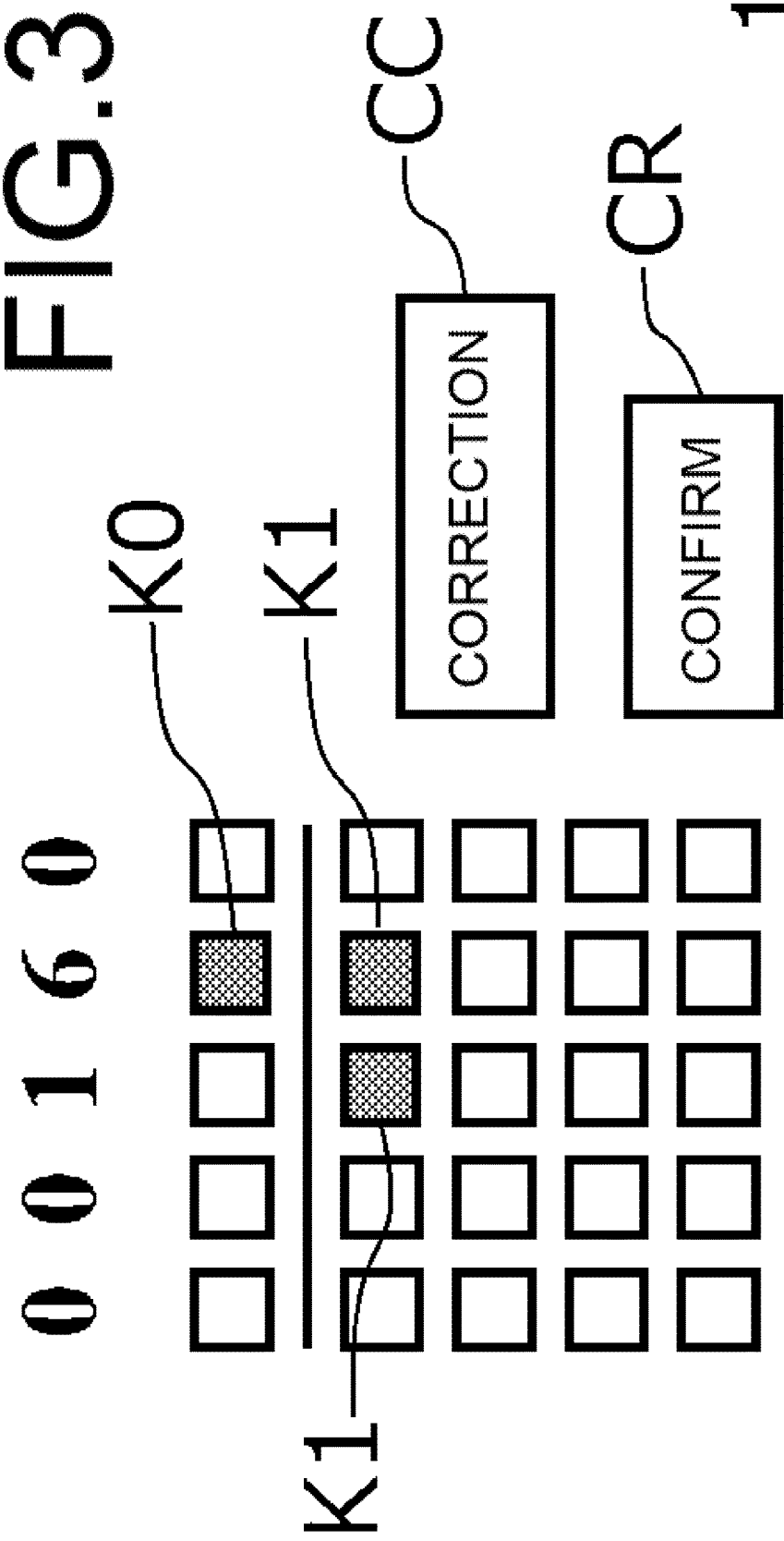

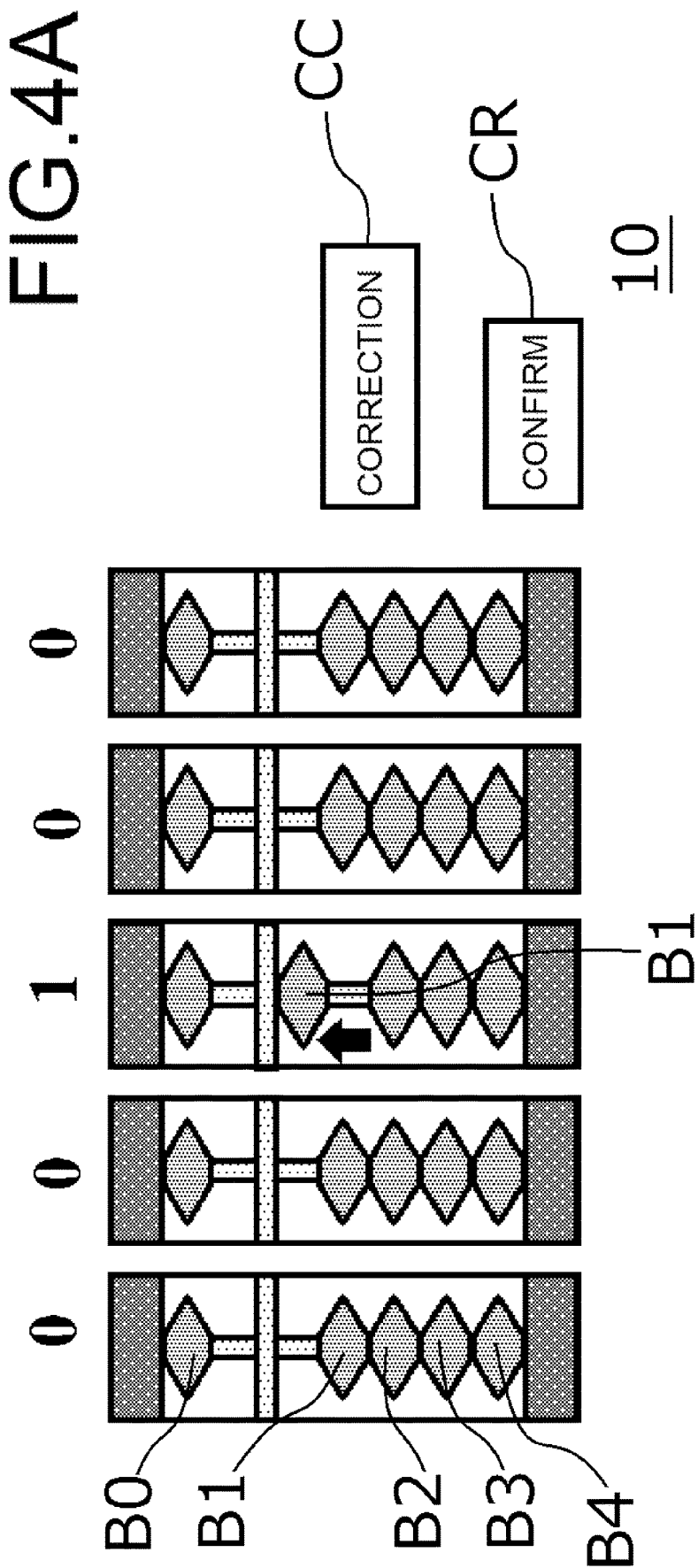

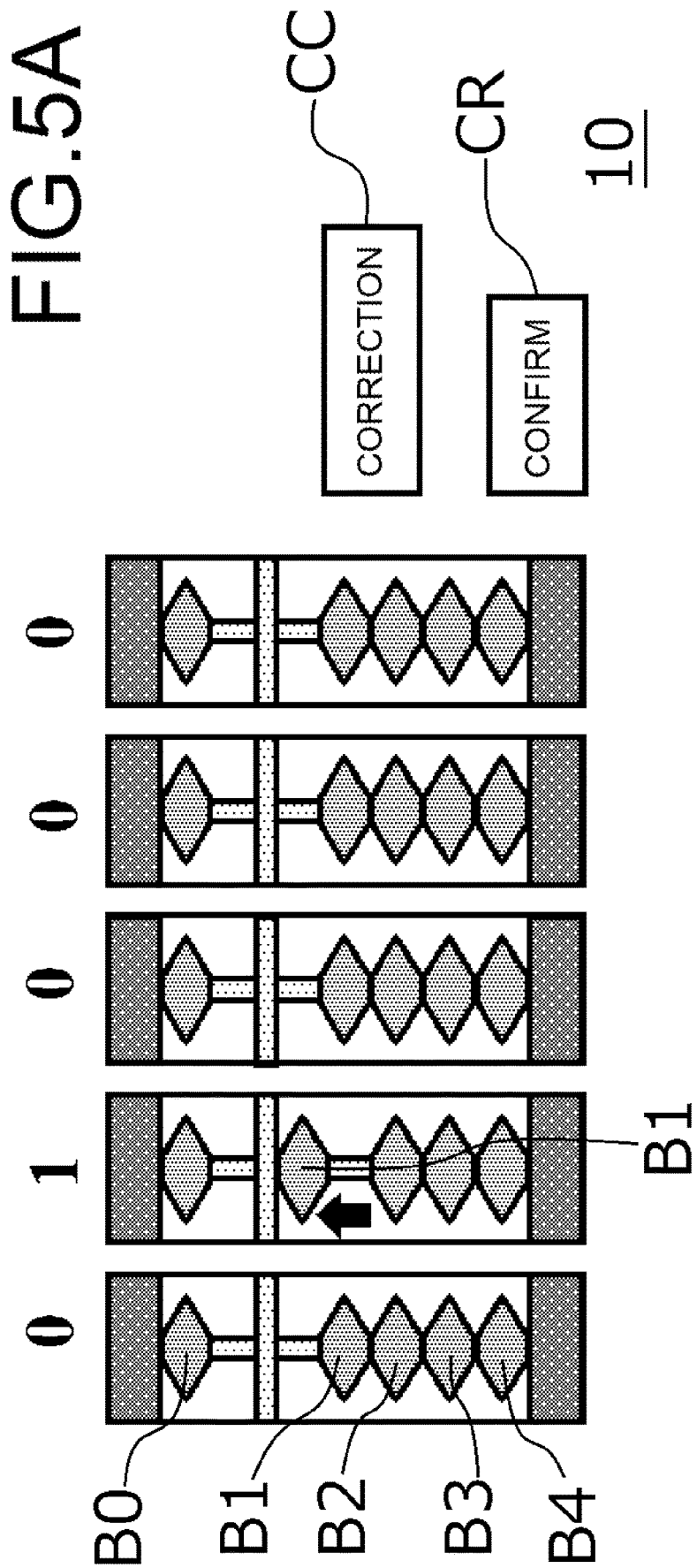

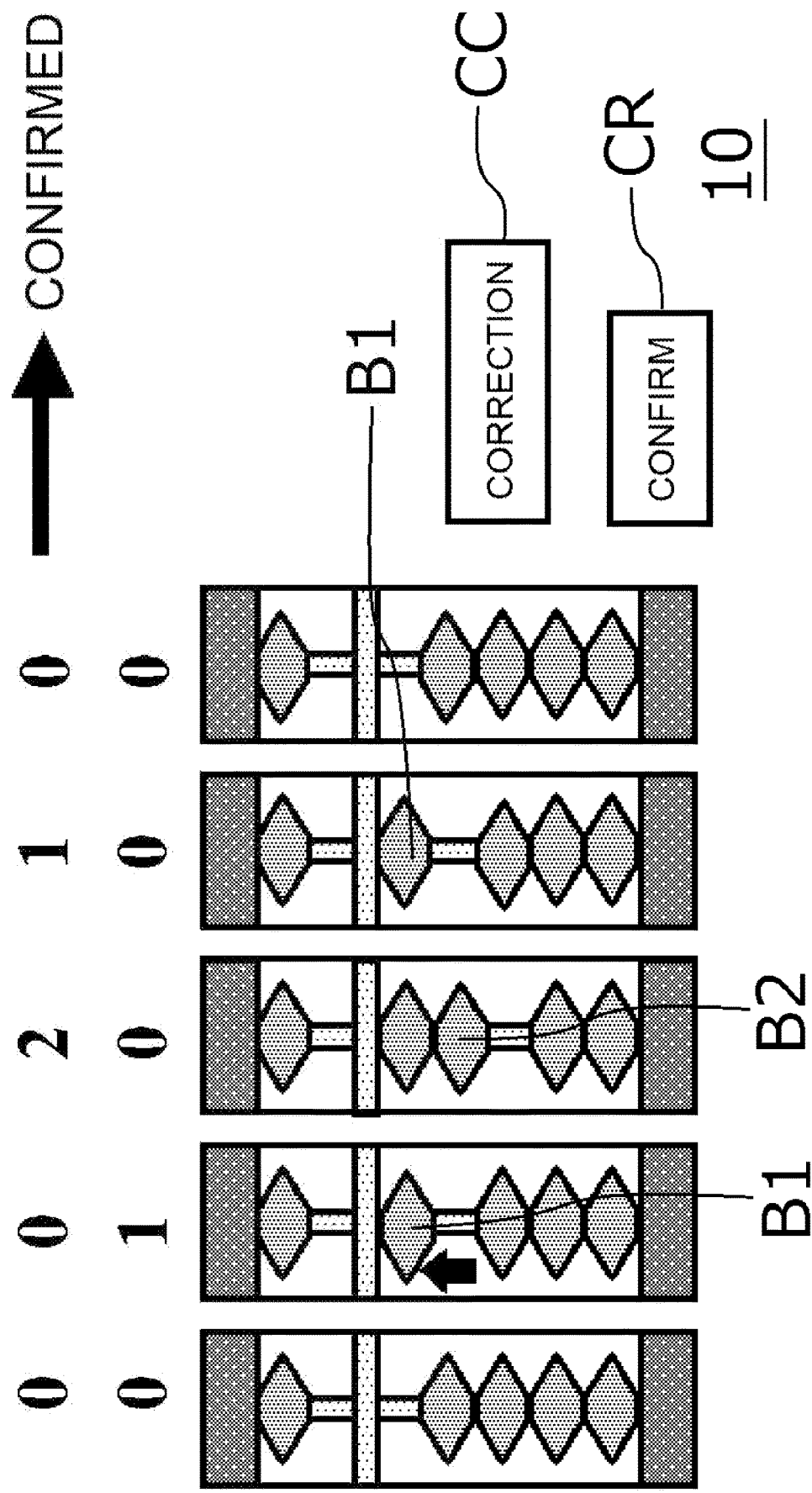

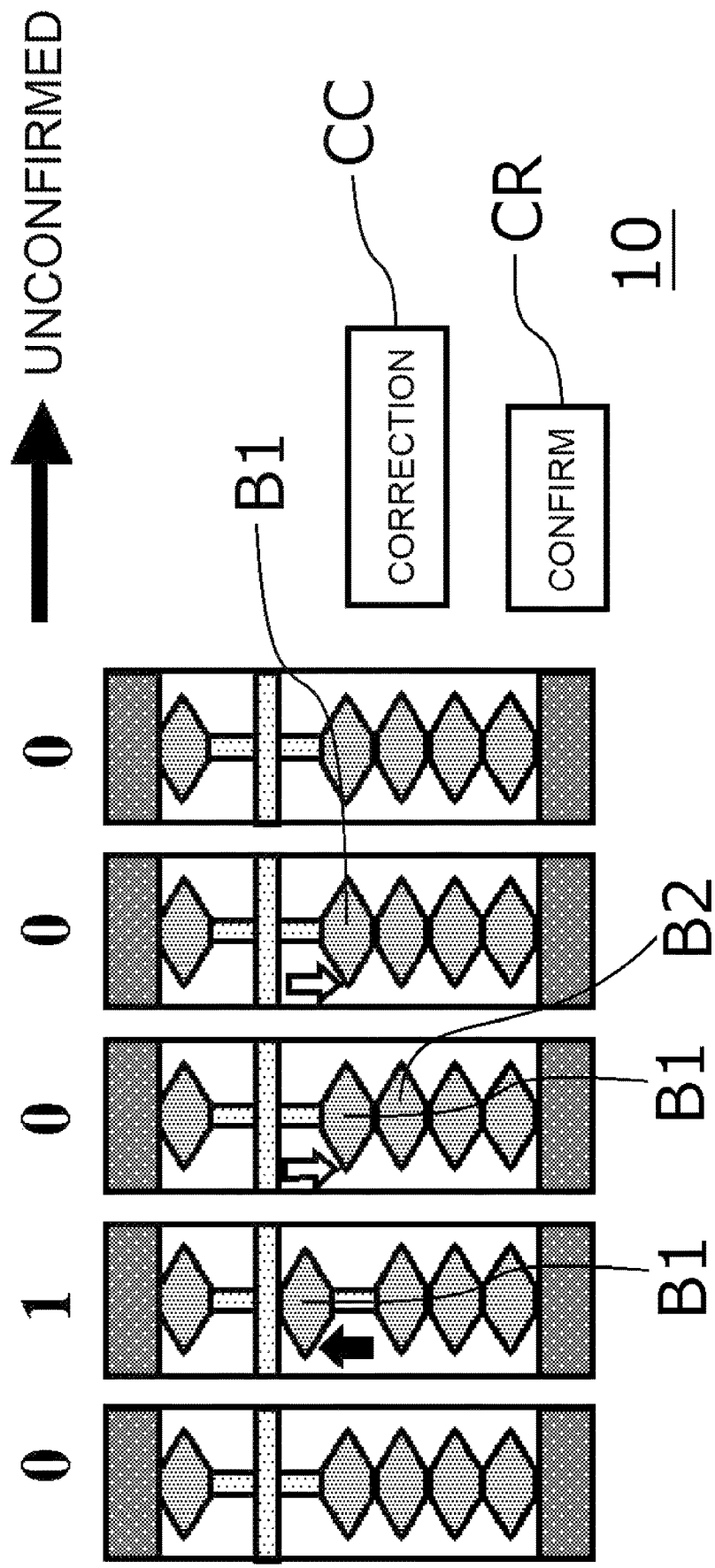

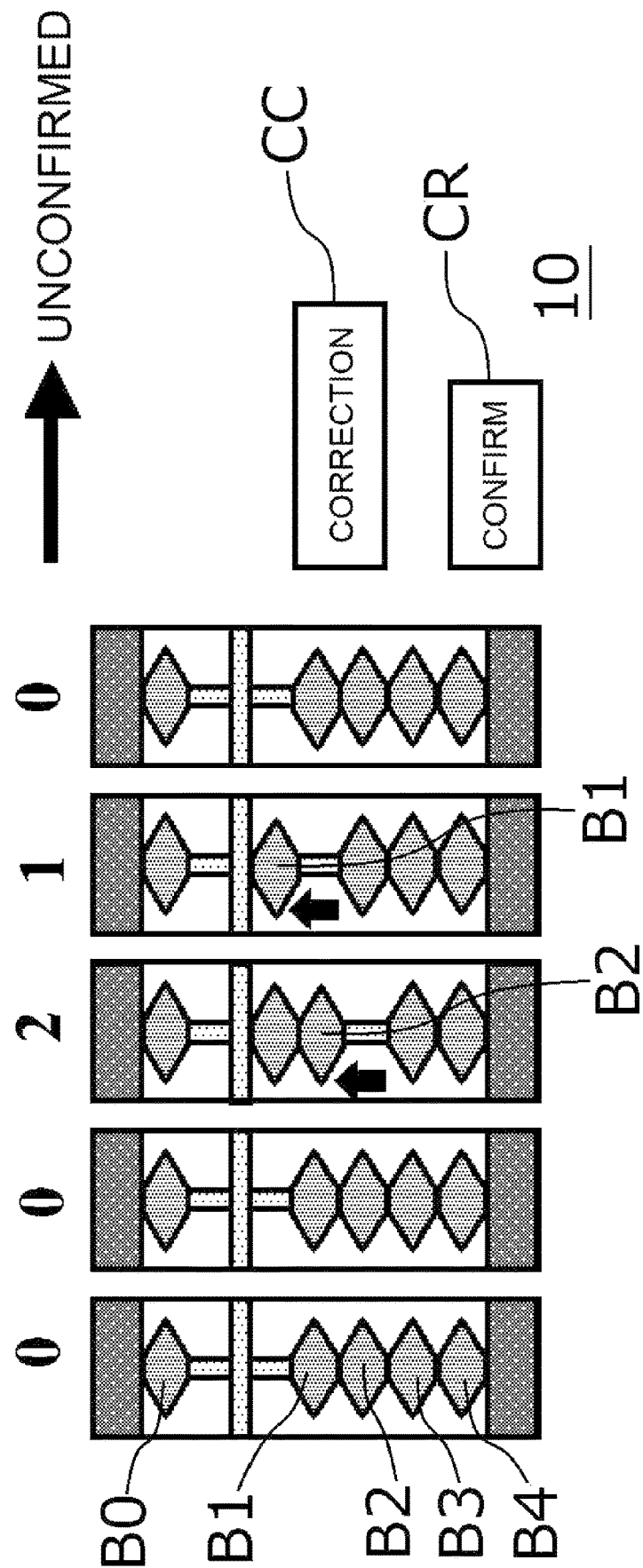

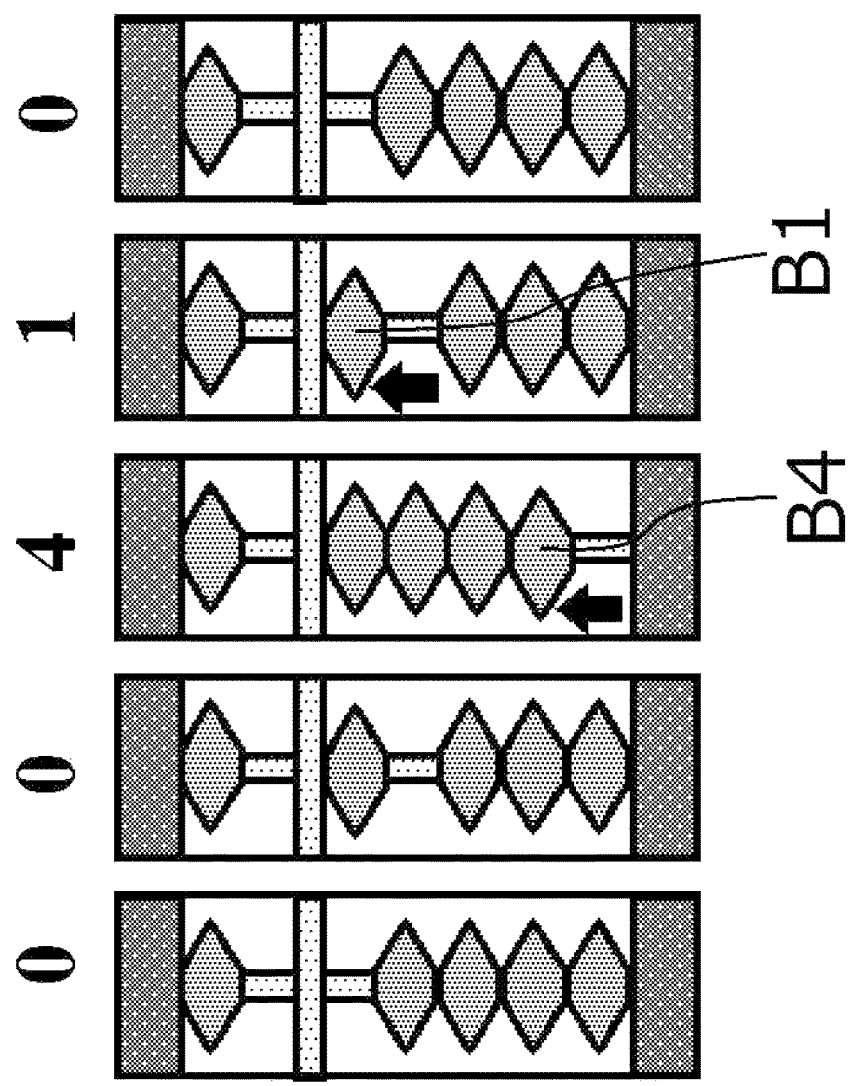
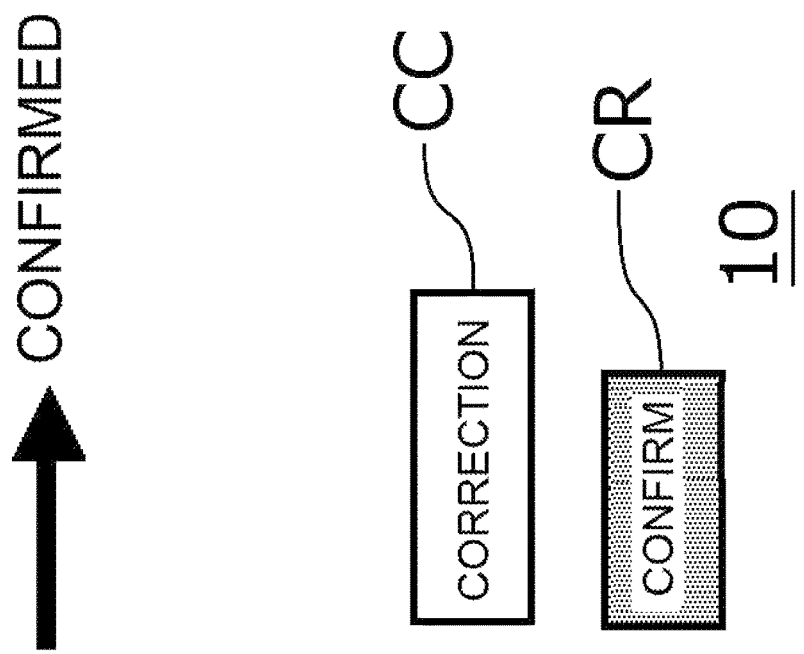
FIG.8C

NUMERICAL VALUE INPUT APPARATUS, CHARACTER INPUT APPARATUS

TECHNICAL FIELD

The present invention relates to a numerical value input apparatus and a character input apparatus that set numerical values and characters by a user operation and convert the numerical values and characters into electric signals.

BACKGROUND ART

In order to input a numerical value on a personal computer, an electronic desk calculator (calculator), or the like, a numeric keypad provided with an array of operation keys (numerical value setting keys) corresponding to 0 to 9 and other operator keys is widely used, and numerical values set by the operation thereof are converted into electric signals and used for various calculations, or the like. On the other hand, abacuses have been widely used for a long time for simple arithmetic calculation (especially addition and subtraction). In the case of an abacus, a large number of arrays of five beads in the vertical direction, which represent the numbers 0 to 9, are arranged in the horizontal direction corresponding to digits. In particular, in a case of performing addition and subtraction, an expert is often able to produce results faster and more accurately when using an abacus than when using a calculator that uses a numeric keypad as described above.

Therefore, Patent Literature 1 describes an input apparatus in which numerical value input is performed in the same manner as an abacus. In this apparatus, numerical value setting keys are arranged in the vertical direction corresponding to the beads of an abacus (five keys corresponding to the numerical values 0 to 9), and in the horizontal direction (a large number corresponding to the digits). The position (vertical position) of the abacus beads is displayed by turning ON/OFF the lighting of each numerical value setting key. With such a configuration, in this apparatus, the numerical value input may be performed in the same manner as an abacus, and the processing speed of the simple arithmetic calculation is faster than that of a normal calculator or the like.

CITATION LIST

Patent Literature

[Patent Literature 1] JP 1107-210284A

SUMMARY OF THE INVENTION

Technical Problem

Even in the case of the numerical value input apparatus described above, many operations are necessary. Therefore, the processing speed of the numerical value input apparatus described above is not actually sufficient even in a case of performing simple arithmetic calculation.

On the other hand, in the case of input of an actual abacus, the main purpose is to perform addition, so in a case of performing this input method as is using key operation, there may be cases in which there is uncertainty in the entered numerical values. For example, an abacus is unable to distinguish between a case of inputting 1001 and a case of inputting 1000+1. On an abacus, such cases as these do not pose a problem; however, they may become a problem in a case where the purpose is inputting numerical values.

Therefore, there is a demand to be able to perform quick input using the abacus method without uncertainty.

In view of such a situation, it is an object of the present invention to provide a technique capable of solving the problem described above.

Solution to Problem

The numerical value input apparatus includes an operation input unit that uses in combination a plurality of numerical value setting operation units in which two states are set for each; a number is represented by a combination of the states of the plurality of numerical value setting operation units so that 0 is represented in a case in which each of the plurality of numerical value setting operation units is in an initial state, and by providing a plurality of the numerical value setting operation units for each digit; numerical values of a plurality of digits are expressed; with each of the plurality of numerical value setting operation units being biased to a side that is the initial state; and also includes a signal generation unit that, in a case in which an input confirmation key provided separately from the numerical value setting operation units is operated, confirms a numerical value that reflects the state of the numerical value setting operation units for each digit when the input confirmation key is operated, and converts the numerical value into an electric signal.

Effect of Invention

With the configuration described above, quick input using the abacus method may be performed without uncertainty.

BRIEF DESCRIPTION OF THE DRAWINGS

FIG. 2A illustrates an example of a display in a case where a mechanical configuration similar to that of an actual abacus is used in a numerical value input apparatus according to an embodiment of the present invention.

FIG. 2B illustrates an example of a display in a case where a mechanical configuration similar to that of an actual abacus is used in a numerical value input apparatus according to an embodiment of the present invention.

FIG. 2C illustrates an example of a display in a case where a mechanical configuration similar to that of an actual abacus is used in a numerical value input apparatus according to an embodiment of the present invention.

FIG. 3A illustrates an example of a display in a case where operation keys are used instead of the beads of an abacus in a numerical value input apparatus according to an embodiment of the present invention.

FIG. 3B illustrates an example of a display in a case where operation keys are used instead of the beads of an abacus in a numerical value input apparatus according to an embodiment of the present invention.

FIG. 4A illustrates an example of a first confirmation operation in a numerical value input apparatus according to an embodiment of the present invention.

FIG. 5A illustrates an example of operation in a case where an input confirmation key is used in a numerical value input apparatus according to an embodiment of the present invention.

FIG. 6B illustrates an example of a second confirmation operation in a numerical value input apparatus according to an embodiment of the present invention.

FIG. 6C illustrates an example of a second confirmation operation in a numerical value input apparatus according to an embodiment of the present invention.

FIG. 7A illustrates an example of a third confirmation operation in a numerical value input apparatus according to an embodiment of the present invention.

FIG. 8C illustrates an example of operation in a case where an input confirmation key is used in a numerical value input apparatus according to an embodiment of the present invention.

DESCRIPTION OF THE EMBODIMENTS

Figure 1:
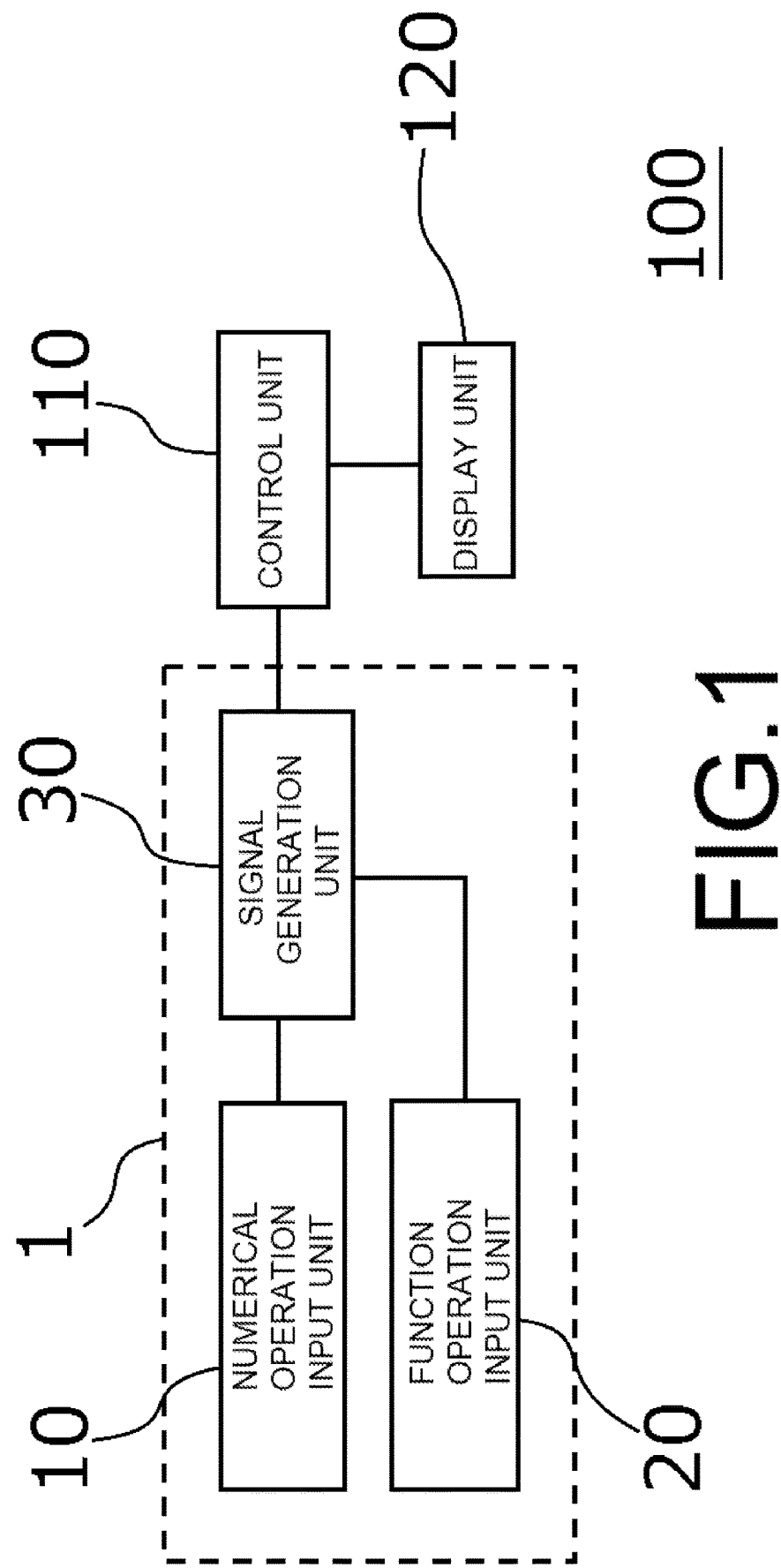
FIG. 1 is a diagram illustrating a configuration of a personal computer in which a numerical value input apparatus according to an embodiment of the present invention is used.

Hereinafter, a numerical value input apparatus according to an embodiment of the present invention will be described. FIG. 1 is a diagram illustrating a configuration of a personal computer 100 in which a numerical value input apparatus 1 is used for numerical value input. In this personal computer 100, a control unit 110 that includes a CPU receives numerical values displayed in decimal by the numerical value input apparatus 1 and electric signals corresponding to various operations, and performs various processes (numerical calculation, and the like) according to this. Numerical values recognized by the control unit 110 as being inputted by an operation input apparatus (numerical value input apparatus) 1 and various results are displayed on a display unit 120 that includes a display.

In the operation input apparatus 1, a numerical operation input unit (operation input unit) 10 used by a user especially for inputting numerical values, and a function operation input unit 20 used for input other than numerical values (for example, various operators, cursor operations, and the like) are provided. A signal generation unit 30 generates an electric signal according to an operation performed by the user on the numerical operation input unit 10 and the function operation input unit 20, and according to the electric signal, the control unit 110 recognizes the inputted numerical value and the requested operation.

Moreover, FIGS. 2A to 2C are diagrams illustrating the configuration of the numerical operation input unit 10 in the operation input apparatus 1, in which numbers are inputted in the same manner as an abacus. Here, a case of expressing a 5-digit number is illustrated. Therefore, the numerical operation input unit 10 may be provided with a mechanical structure similar to that of an actual abacus, and similar to the technique described in Patent Literature 1, may be configured so that one bead of an abacus corresponds to one operation key (numerical value setting operation unit). FIGS. 2A to 2C illustrate a case in which a corresponding actual abacus is the numerical operation input unit 10, and FIGS. 3A to 3C illustrate a case in which the arrangement of the operation keys is configured such that one bead on the abacus is one numerical value setting operation unit, respectively.

Figure 3C:
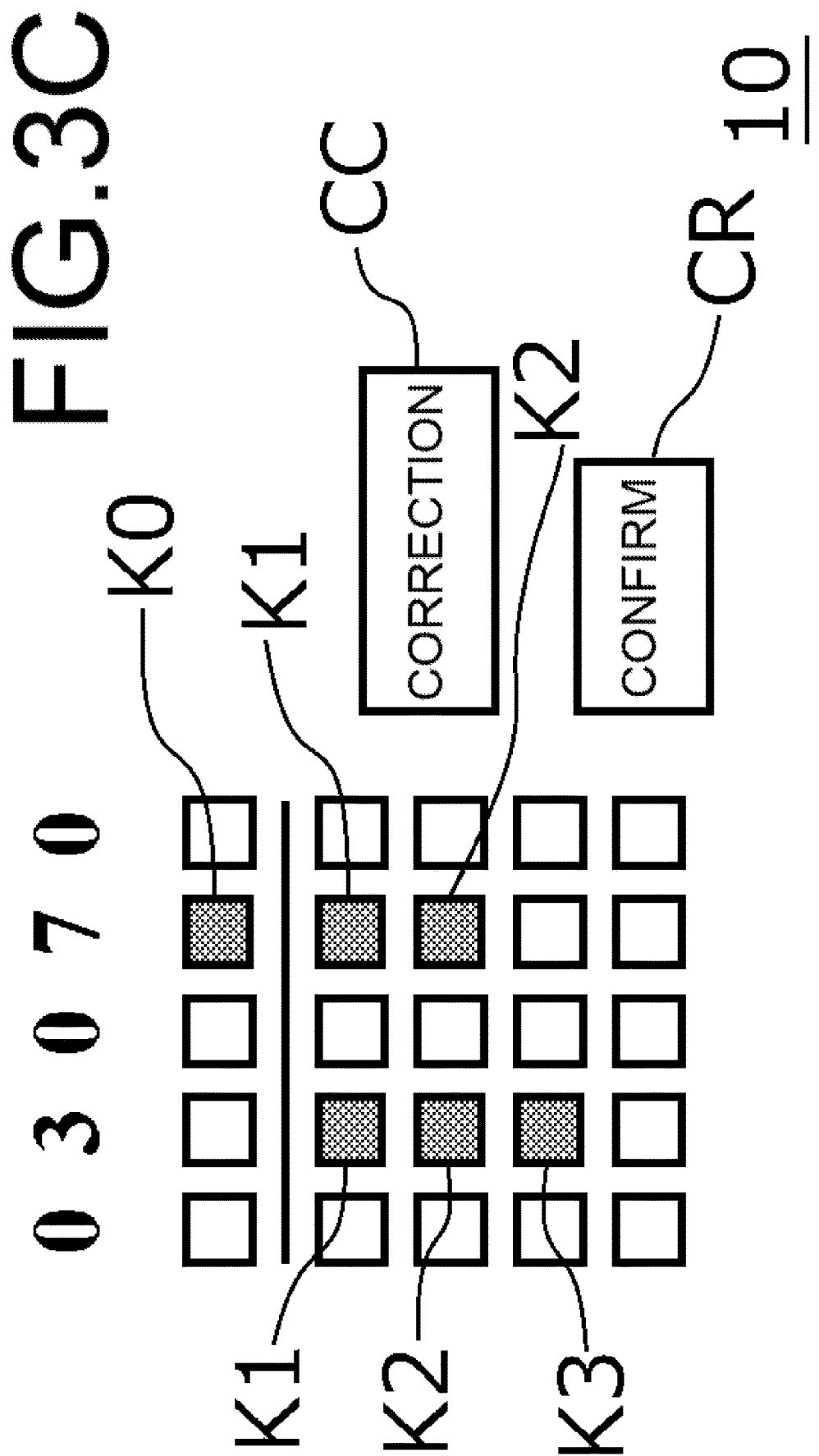
FIG. 3C illustrates an example of a display in a case where operation keys are used instead of the beads of an abacus in a numerical value input apparatus according to an embodiment of the present invention.

In FIGS. 2A to 2C and FIGS. 3A to 3C, FIG. 2A and FIG. 3A illustrate a case of displaying a 5-digit number "00000", FIG. 2B and FIG. 3B illustrate a display of a number "00160", and FIG. 2C and FIG. 3C illustrate a display of a number "03070", respectively. In the case of using a mechanical structure similar to that of an abacus (FIGS. 2A to 2C), in order to represent the numbers 0 to 9, five beads B0 to B4 from the top (numerical value setting operation unit) are used in each column (corresponding to a digit). Each of the beads B0 to B4 takes one of two states, or in other words, a state of being on the upper side and a state of being on the lower side. As illustrated by all the digits in FIG. 2A, the state in which the bead B0 is on the upper side and the beads B1 to B4 are on the lower side corresponds to "0", and each bead is set to this state by a spring biasing force. In other words, the bead B0 is biased upward, and the beads B1 to B4 are biased downward. Therefore, in this operation input apparatus 1, 0 is set as an initial value of a numerical value at a certain digit, and in a case in which this numerical value is 1 to 9, some operation is required, and when this numerical value is 0, no operation is required.

Therefore, the state of FIG. 2A, is a state in which the user does not touch the numerical operation input unit 10 at all, and in this case, "00000" is displayed. On the other hand, by the user operating the corresponding beads against the spring, it is possible to set a state of displaying "00160" and "03070" as illustrated in FIGS. 2B and 2C. At this time, the beads B1 to B4 are adjacent to each other in the vertical direction and are biased by springs as described above, so in FIG. 2C, by operating the bead B3 in the thousands' place it is not necessary to touch the beads B1 and B2, and by operating the bead B2 in the tens' place it is not necessary to touch the bead B1. Whether each bead is in the upper or lower state may be recognized by providing a sensor for recognizing the position of each bead, whereby the above-mentioned 5-digit numerical value may be recognized.

On the other hand, in FIGS. 3A to 3C, instead of the beads B0 to B4 described above, operation keys (numerical value setting operation units) K0 to K4 corresponding to the beads B0 to B4 are provided in each column (corresponding to a digit). Here, all of the operation keys K0 to K4 are biased by a spring toward the front side of the paper, and the state in which the operation key K0 is on the front side may be made to correspond to the state described above in which bead B0 is on the upper side, and the state in which the operation keys K1 to K4 are on the front side may be made to correspond to the state described above in which the beads B1 to B4 are on the lower side. Here, in a case in which the operation keys K2 to K4 are operated (pressed), it is possible to recognize that, of the operation keys K1 to K3, the operation keys above the operated operation keys are operated at the same time. In FIGS. 3B and 3C, the operation keys that are recognized as being operated in this way are indicated by hatching, and this holds true for other keys described below. As a result, as in the case of FIGS. 2A to 2C, it is possible to express a 5-digit numerical value using the operation keys K0 to K4 in the same manner as in the case of the abacus.

In any of the configurations of FIGS. 2A to 2C and FIGS. 3A to 3C, when the input of the 5-digit numerical value is completed, the signal generating unit 30 recognizes this, and in doing so, the signal generation unit 30 can confirm the 5-digit numerical value and output the value as an electric signal to the control unit 110 side. In order for this, in addition to the beads B0 to B4 and the operation keys K0 to K4 used for setting the numerical value as described above, an input confirmation key CR for confirming the set numerical values is provided. In either configuration, in a case where the input confirmation key CR is operated (pressed), the signal generation unit 30 outputs the numerical value set at that time to the control unit 110 as an electric signal corresponding to the numerical value. Therefore, the control unit 10 recognizes that "00000" has been inputted as a numeric value in a case where the input confirmation key CR is operated in the states in FIGS. 2A and 3A, recognizes that "00160" has been inputted as a numeric value in a case where the input confirmation key CR is operated in the states in FIGS. 2B and 3B, and recognizes that "03070" has been inputted as a numeric value in a case where the input confirmation key CR is operated in the states in FIGS. 2C and 3C, respectively. Particularly, in a case of such an abacus method, when numerical values consisting of a plurality of digits are to be continuously inputted, operation such as this for confirming the input is necessary.

On the other hand, in this operation input apparatus 1, as will be described later, even in a case where the input confirmation key CR is not operated in response to the operation of the beads B0 to B4 and the operation keys K0 to K4, the signal generation unit 30 may in some cases output a 5-digit numerical value to the control unit 110 as an electric signal corresponding to the numerical value. Moreover, in that case, a correction key CC that is used for correcting the numerical value without outputting an electric signal corresponding to the 5-digit numerical value is provided.

In the operation input apparatus 1 described above, although a numerical value is inputted in the same manner as an abacus, by using the input confirmation key CR, there is no uncertainty in regard to the inputted 5-digit numerical value. Therefore, not only is it possible to perform addition using inputted 5-digit numerical values, but also various operations may be reliably performed by the control unit 110.

However, in this operation input apparatus 1, even in a case where the input confirmation key CR is not operated, the signal generation unit 30, depending on the case, outputs a 5-digit numerical value to the control unit 110. Therefore, together with being able to save the user's trouble of operating the input confirmation key CR, it is also possible to eliminate uncertainty in regard to the inputted numerical value. This operation will be described below. Here, the case illustrated in FIGS. 2A to 2C in which the numerical operation input unit 10 has the same mechanical structure as an actual abacus will be explained; however, as described above, the operation is the same in the case illustrated FIGS. 3A to 3C in which operation keys are used.

Figure 4B:
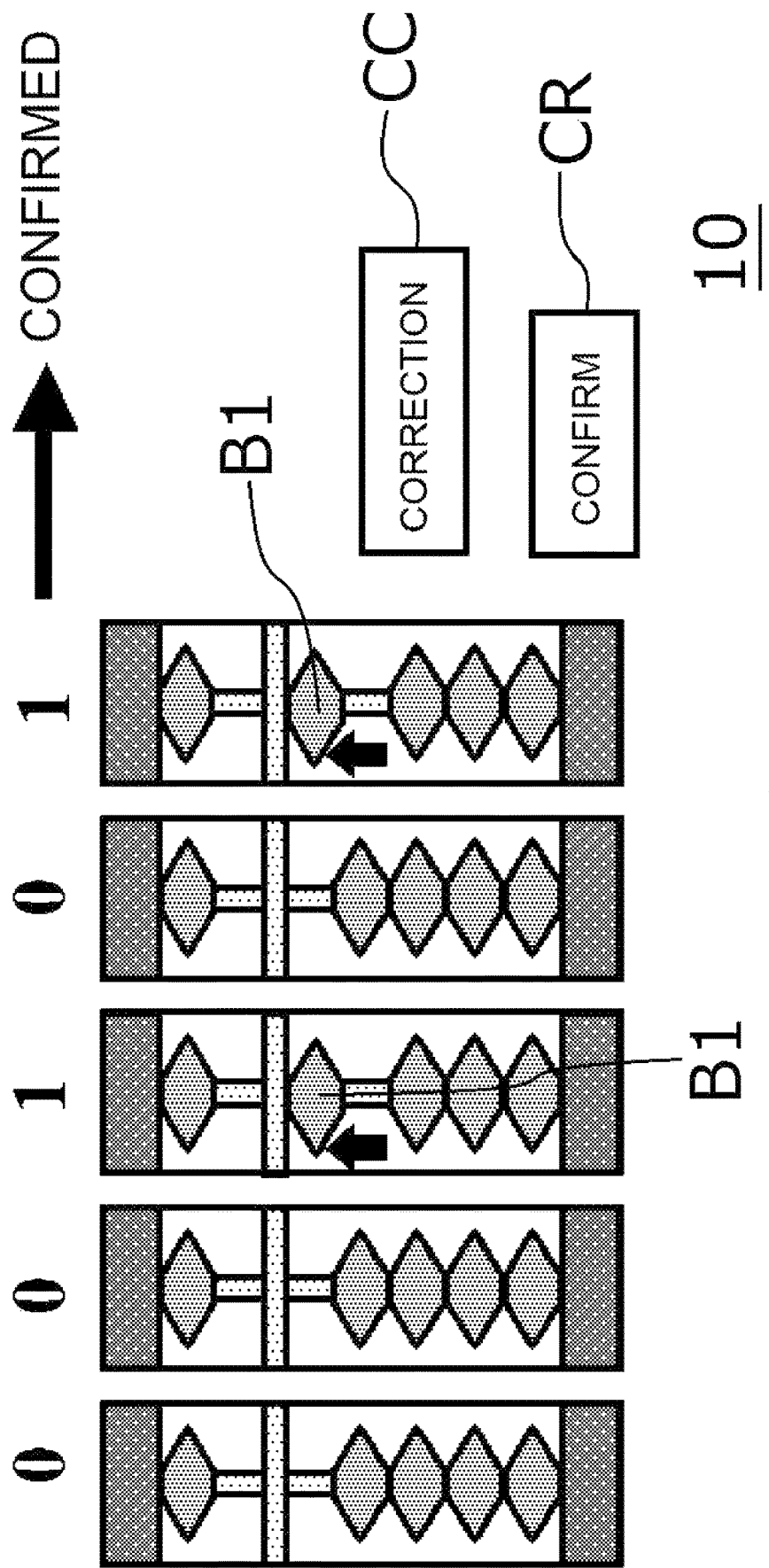
FIG. 4B illustrates an example of a first confirmation operation in a numerical value input apparatus according to an embodiment of the present invention.

First, in a case where it is presumed that input of a 5-digit numerical value will be performed from a high-order digit and operation of the least significant digit (ones' place) is performed even in a case where the input confirmation key CR is not operated, it is possible to confirm the 5-digit numerical value (first confirmation operation). FIGS. 4A and 4B are examples illustrating the operation in this case. Here, a case in which "00101" is inputted is illustrated. FIG. 4A illustrates a state (corresponding to "00100") immediately after inputting "1" in the hundreds' place when inputting "00101" from the high-order digit. Here, the bead B1 in the hundreds' place is moved upward against the biasing force. After that, as illustrated in FIG. 4B, while maintaining this state, the bead B1 in the ones' place is moved upward against the biasing force, whereby the display becomes "00101".

Here, when it is recognized that the operation of the least significant digit has been performed, it may be considered that the input of the numerical value is completed, so immediately after the operation illustrated in FIG. 4B has been performed, the signal generation unit 30, even though the input confirmation key CR is not operated, is able to output an electric signal for "00101" displayed in this step to the control unit 110. Similarly, even in a case where the value of the least significant digit is 2 to 9, an operation against the biasing force is performed on at least one of the beads B0 to B4, and therefore the signal generation unit 30 can recognize this, and similarly, can output the corresponding 5-digit numerical value as an electric signal.

Figure 5B:
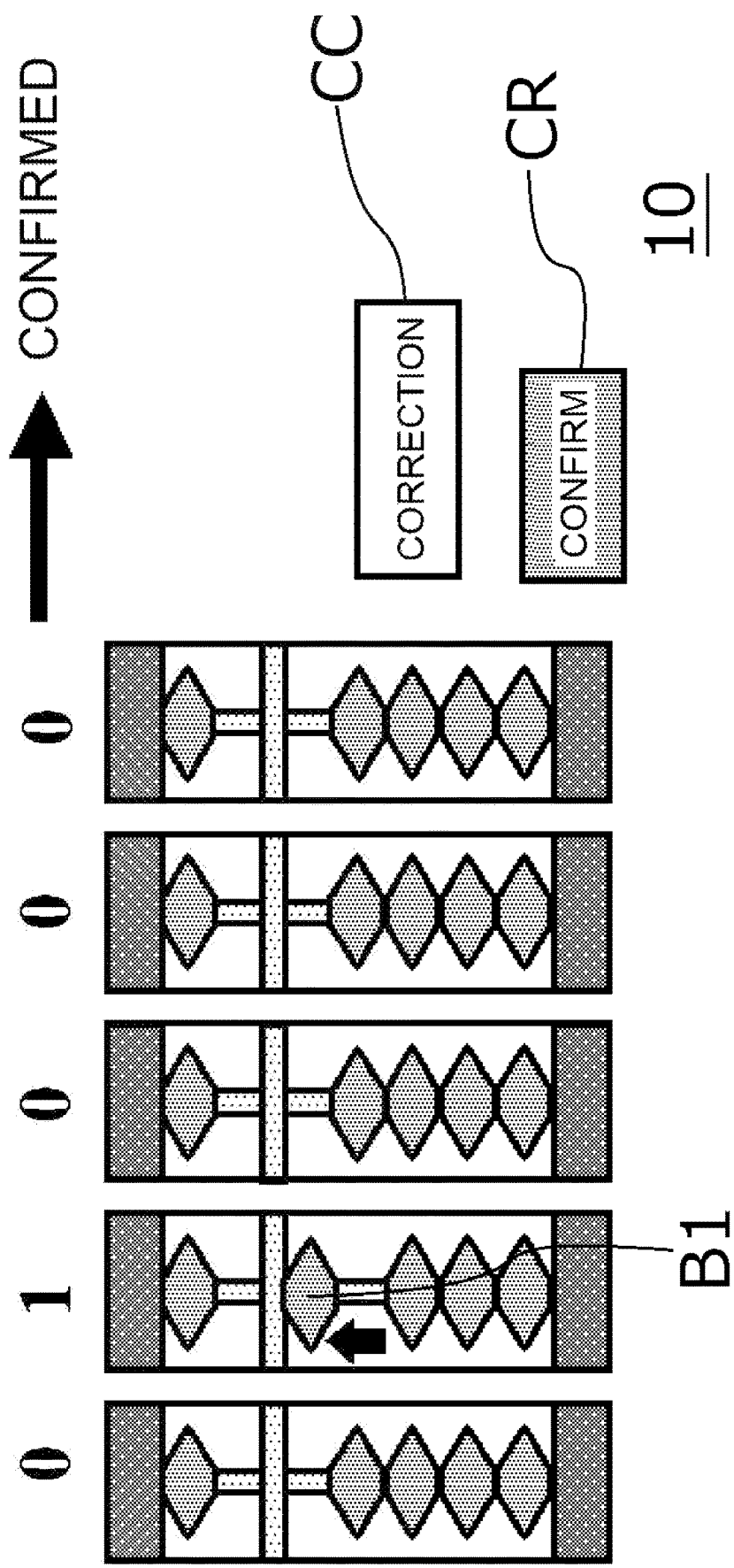
FIG. 5B illustrates an example of operation in a case where an input confirmation key is used in a numerical value input apparatus according to an embodiment of the present invention.

On the other hand, in a case where the value of the least significant digit is 0, none of the beads of the least significant digit are operated. FIGS. 5A and 5B are examples illustrating an operation when inputting such as "01000" (1000). In this case, in order to confirm the input of the 5-digit numerical value it is necessary to operate the input confirmation key CR. Here, in FIG. 5A, the bead B1 at the thousands' place (second from the left) is operated upward against the biasing force, and no operation is performed at all on the beads of other digits. Therefore, as shown in FIG. 5B, by operating the input confirmation key CR, the user is able to confirm "01000", and cause the signal generation unit 30 to output this.

In other words, in the operation input apparatus 1, in a case where the least significant digit is 1 to 9, some operation on the beads B0 to B4 is necessary, but the operation of the input confirmation key CR is not necessary instead. On the other hand, in a case where the least significant digit is 0, operation on the beads B0 to B4 is not necessary, and operation of the input confirmation key CR is performed instead. Therefore, it is possible to quickly input the numerical value in the abacus method.

In addition, in the example of FIGS. 4A and 4B, "00101" is automatically confirmed and outputted, but there is a possibility that the user may subsequently operate the input confirmation key CR as in the case of FIGS. 5A and 5B, and in this case, there is a possibility that "00101" may be erroneously output twice in a row. Therefore, in a case where output is performed as illustrated in FIG. 4B, for example, the input confirmation key CR is preferably invalidated for a specified short time (for example, about 1 second).

Figure 6A:
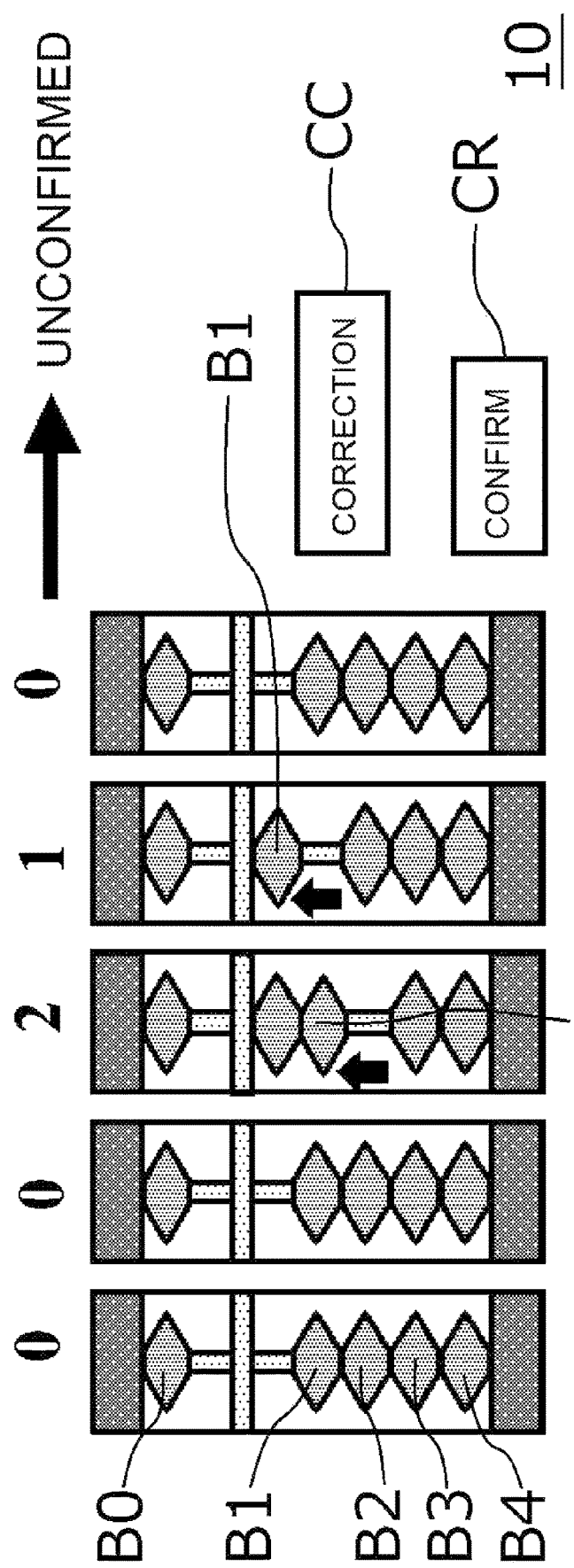
FIG. 6A illustrates an example of a second confirmation operation in a numerical value input apparatus according to an embodiment of the present invention.

Moreover, as in the case of FIGS. 4A and 4B, it is also possible in other cases as well to confirm a 5-digit numerical value without operating the input confirmation key CR. FIGS. 6A to 6C illustrate another example of such an operation (second confirmation operation). Here again, it is presumed that the numerical value is inputted from the high-order digit, and a case is illustrated in which "00210" is inputted. First, as illustrated in FIG. 6A, the bead B2 of the hundreds' digit and the bead B1 of the tens' digit are sequentially operated, and "00210" is displayed. However, here, the ones' digit is 0 and operation is not performed, so the 5-digit numerical value is not confirmed at this point in time.

Next, in this state, as illustrated in FIG. 6B, when the bead B1 of the thousands' digit, which is a digit higher than the digit operated above, is operated and 1 is inputted (B1 moves to the upper side), the signal generation unit 30 is able to recognize that this operation is for inputting a new 5-digit numerical value. In this case, the signal generation unit 30 is able to output "00210", which is the confirmed numerical value at this point in time before the latest operation (operation of the thousands' digit), however, the signal generation unit 30 is able to recognize that the input of a new 5-digit numerical value starts from "01000".

After that, as illustrated in FIG. 6C, when the user releases the hand from the bead B2 of the hundreds' digit, and the bead B1 of the tens' digit, the bias forces acting on these beads set both the hundreds' digit and the tens' digit to a state of 0, and in the newly inputted 5-digit numerical value, at this point in time, except for the ten thousands' digit being 0 and the thousands' digit being 1, the other digits are not confirmed; and then after that, the user is able to set the all of the remaining digits of the numerical value by once again performing appropriate operations on the hundreds' digit, tens' digit and ones' digit, and perform the same operation as in FIGS. 4A and 4B, or FIGS. 5A and 5B.

Figure 7B:
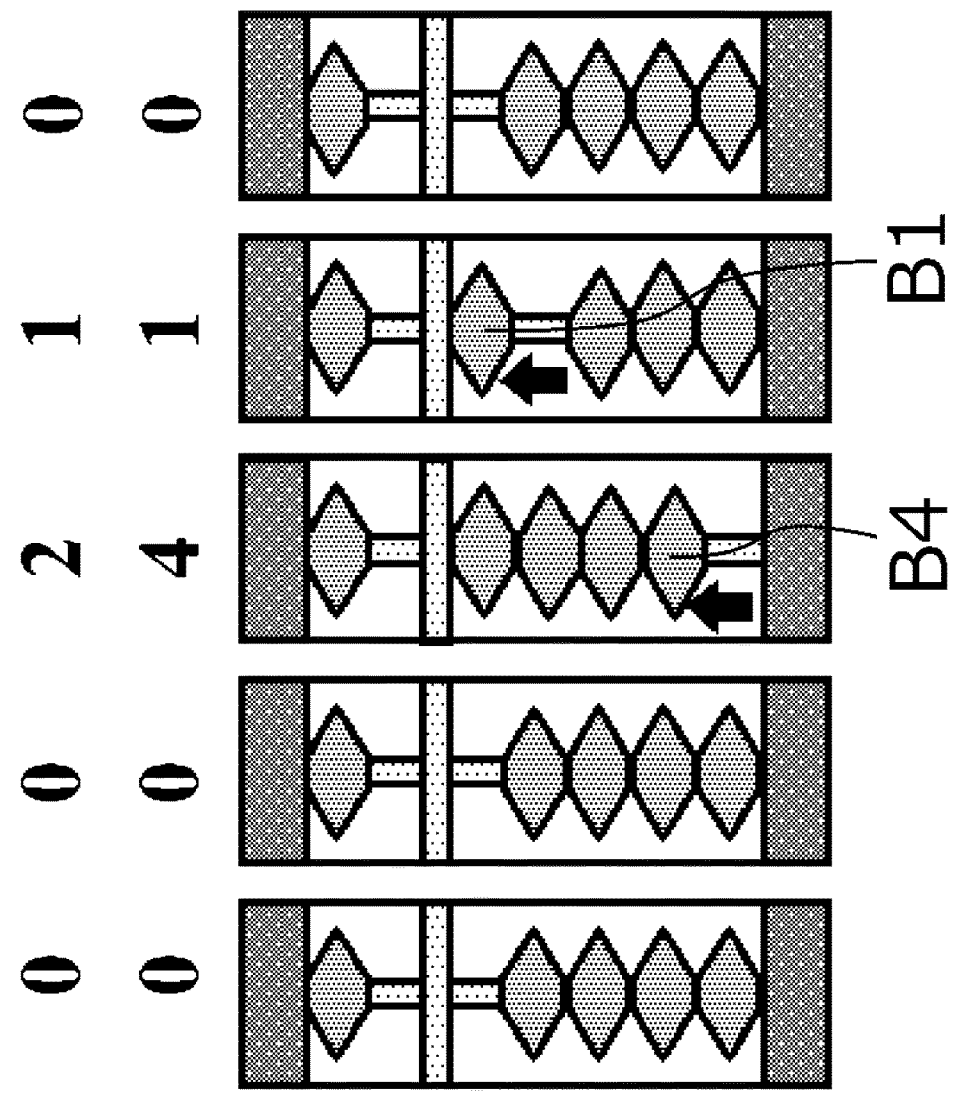
FIG. 7B illustrates an example of a third confirmation operation in a numerical value input apparatus according to an embodiment of the present invention.
Figure 7C:
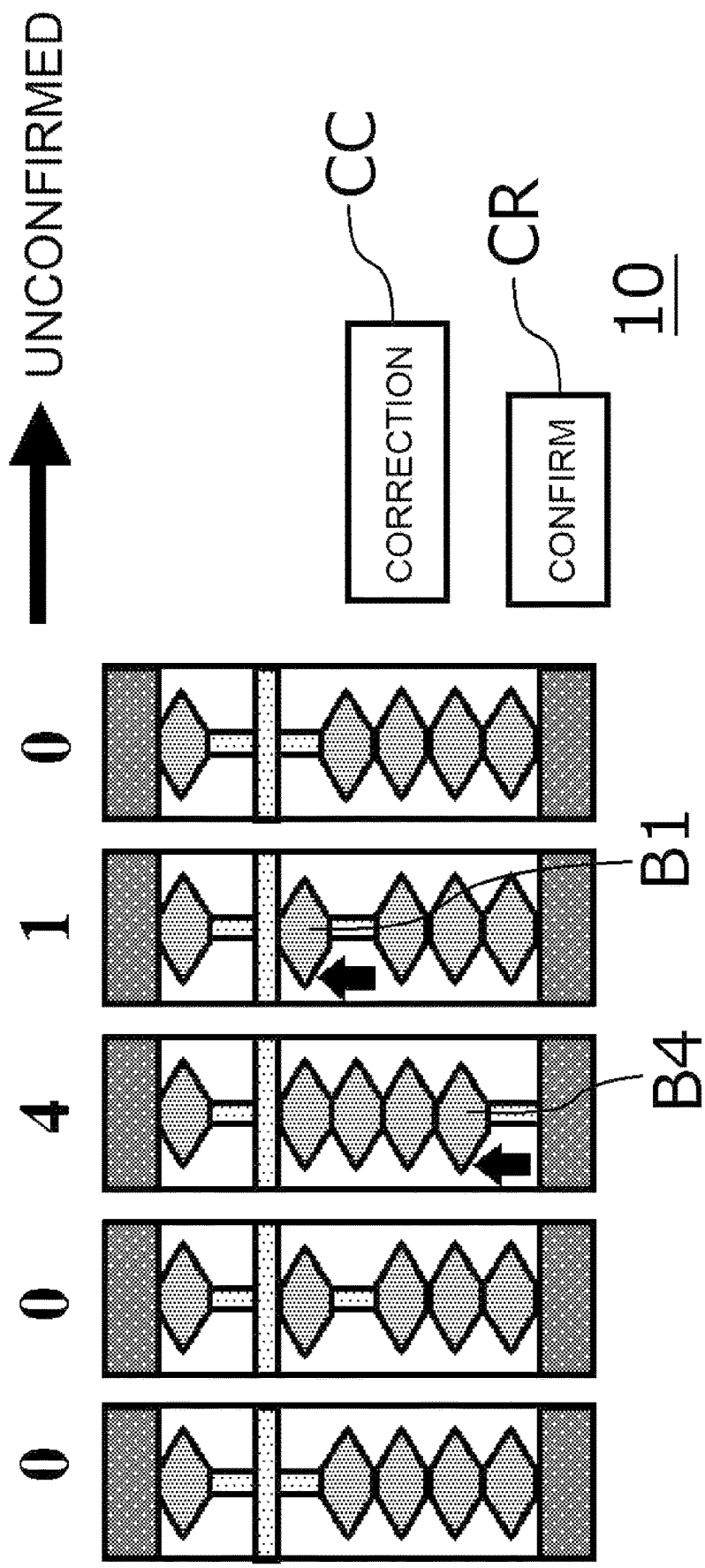
FIG. 7C illustrates an example of a third confirmation operation in a numerical value input apparatus according to an embodiment of the present invention.

FIGS. 7A to 7C illustrate another example operation (third confirmation operation) of confirming a 5-digit numerical value without the need to operate the input confirmation key CR. First, in FIG. 7A, as in FIG. 6A, "00210" is displayed by sequentially operating the bead B2 of the hundreds' digit and the bead B1 of the tens' digit. Next, from this state, as illustrated in FIG. 7B, the display is changed from "00210" to "00410" by operating the bead B4 of the hundreds' digit that has already been operated.

In this case, the signal generation unit 30 is able to recognize that the operation of FIG. 7B is for inputting a new 5-digit numerical value, and thus the value "00210", which is the value before this latest operation (operation of the hundreds' digit) is performed, may be outputted as confirmed at this point, while on the other hand, it is possible to recognize that the input of a new 5-digit numerical value starts from "00410". At this point in time, the ones' digit of this new 5-digit numerical value has not been set, so this 5-digit numerical value is not confirmed, and after that, it is possible to perform the same operation as in FIGS. 4A and 4B or FIGS. 5A and 5B.

Moreover, in the above example, all of the beads B0 to B4 are biased to the side to display 0, so in order to change the numerical value of any digit from 1 to 9, it is necessary for the user to apply a force to one of the beads B0 to B4 of the corresponding digit. Therefore, as another example of confirming the 5-digit numerical value without the need to operate the input confirmation key CR, in a case where the duration of the operation when this operation is performed exceeds a certain threshold value, it is possible to cause the 5-digit numerical value to be confirmed when this occurs (fourth confirmation operation).

More specifically, for example, in order to obtain the state of FIG. 2B, it is necessary for the user to apply a force to the bead B1 of the hundreds' digit, and the beads B0 and B1 of the tens' digit. In a case in which the duration that this state continues exceeds a certain threshold value, the signal generation unit 30 is able to confirm and output "00160".

As described above, it is possible to use a combination of the operations as examples for confirming a 5-digit numerical value without the need to operate the input confirmation key CR. In other words, a 5-digit numerical value may be confirmed depending on which of the first to fourth confirmation operations is performed. After a 5-digit numerical value is confirmed in this way, it is preferable to invalidate the input confirmation key CR for a specified period as described above.

Figure 8A:
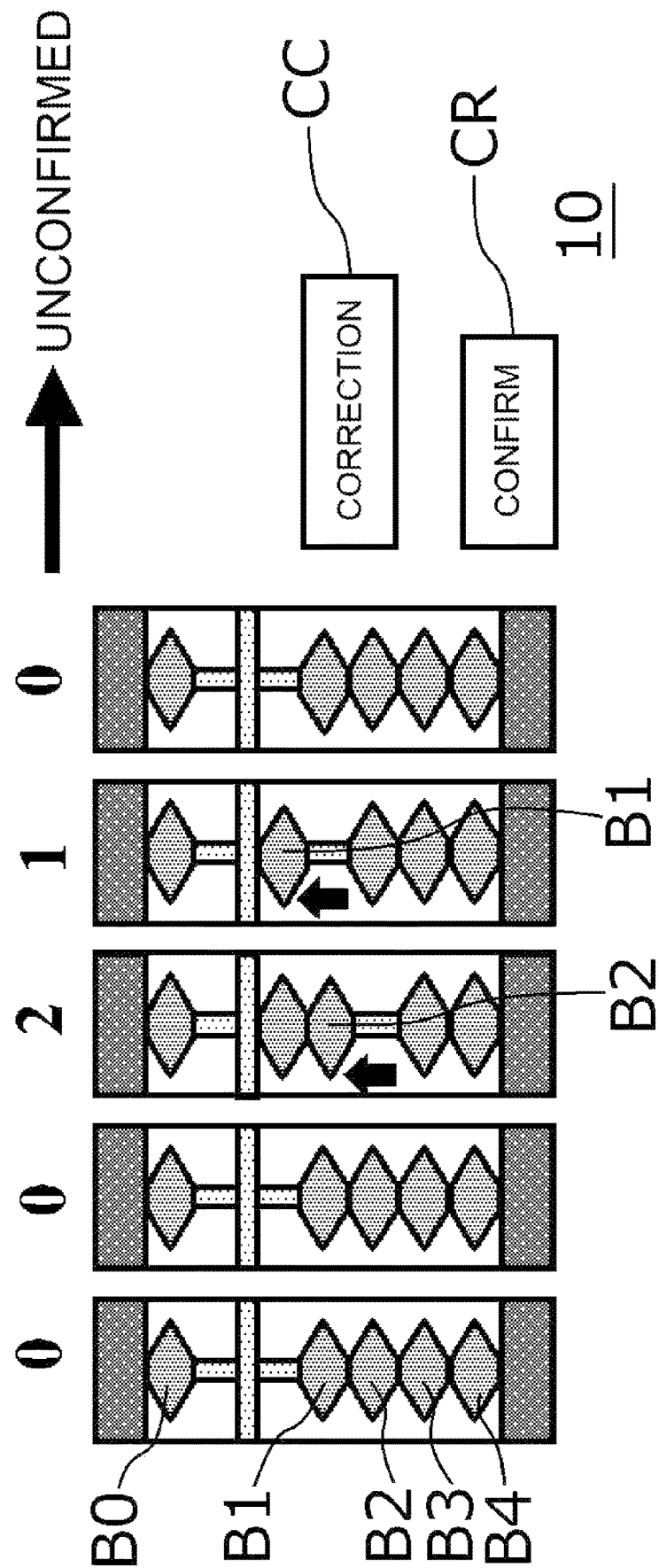
FIG. 8A illustrates an example of operation in a case where a correction key is used in a numerical value input apparatus according to an embodiment of the present invention.
Figure 8B:
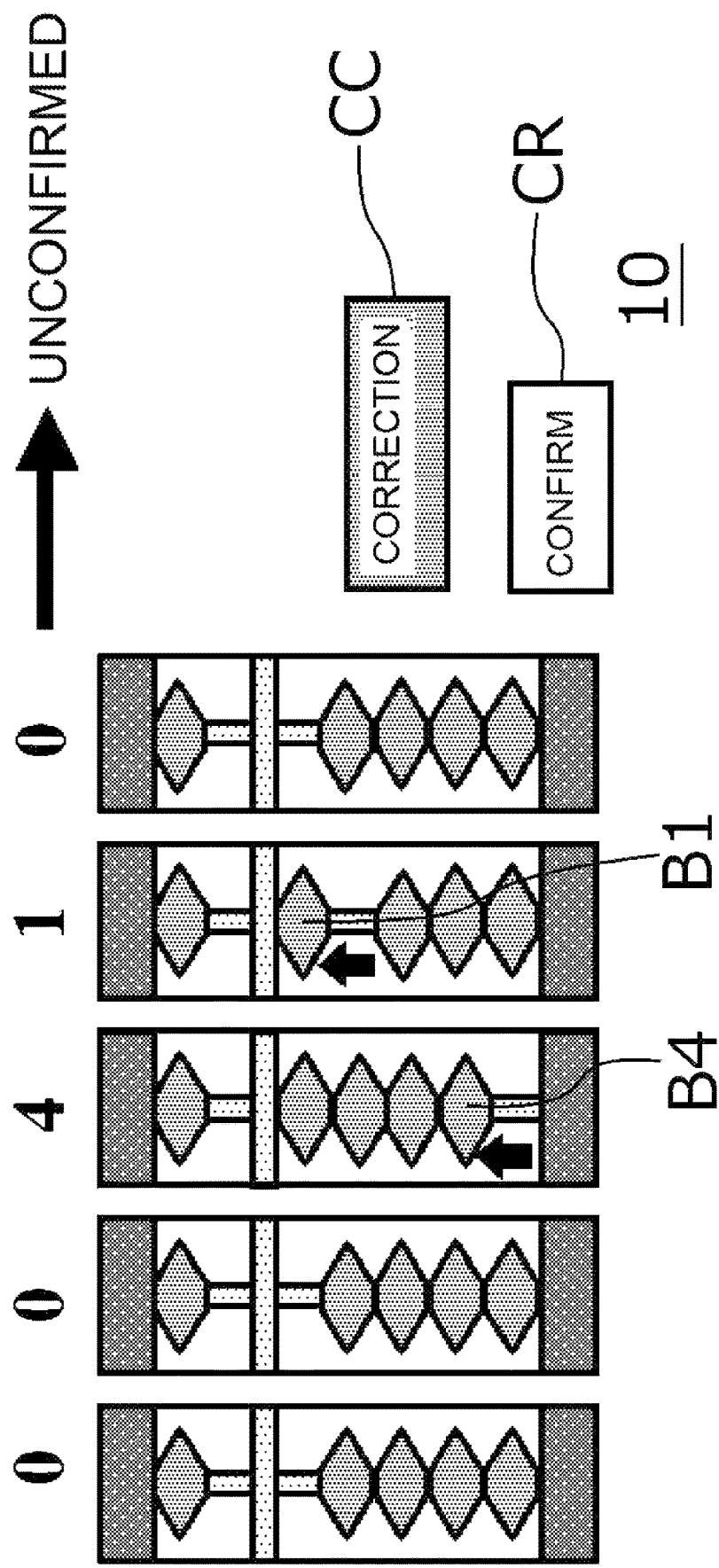
FIG. 8B illustrates an example of operation in a case where an input confirmation key is used in a numerical value input apparatus according to an embodiment of the present invention.

In the third confirmation operation (FIGS. 7A to 7C), the display is changed from "00210" to "00410" by operating the bead B4 of the hundreds' digit that has already been operated in FIG. 7A, and at this point in time, the previously displayed "00210" is confirmed and outputted. On the other hand, there are cases in which it is desired to make a correction without confirming the 5-digit numerical value before the change in this way. In this case, by the correction key CC being operated, the signal generation unit 30 can be set not to perform the third confirmation operation. FIGS. 8A to 8C are diagrams illustrating the operation in this case in correspondence with FIGS. 7A to 7C.

FIG. 8A illustrates a state similar to that of FIG. 7A, and at this point in time, "00210" is displayed in an unconfirmed state. Here, as illustrated in FIG. 8B, the user is able to change from "00210" to "00410" by operating the hundreds' digit while operating the correction key CC. In the example of FIGS. 7A to 7C, at this point "00210" is outputted as being confirmed, whereas when the correction key CC is operated here, "00210" that has not been confirmed is handled as being changed to "00410". After that, as illustrated in FIG. 8C, by the user operating the input confirmation key CR, "00410" is outputted as being confirmed.

In other words, by using such a correction key CC in combination with the third confirmation operation described above, the correction may be easily performed before confirming the 5-digit numerical value that has already been inputted. In this case, the user is able to easily perform this correction by just operating the digit that requires the correction together with the correction key CC.

Note that in the above example, the numerical operation input unit 10 having a mechanical structure similar to that of an actual abacus as shown in FIGS. 2A to 2C is used; however, the same operation may be performed in a configuration in which the beads of the abacus are replaced with operation keys (numerical value setting keys) as illustrated in FIGS. 3A to 3C.

Moreover, the configurations of FIGS. 2A to 2C and FIGS. 3A to 3C may be realized by using the above beads and operation keys (numerical value setting operation unit) as actual mechanical components; however, a similar configuration may also be realized by providing virtual beads or operation keys by displaying the above beads or operation keys on a touch panel display. In other words, the numerical value setting operation unit described above may be provided as actual mechanical components or may be provided virtually on a touch panel display. When the numerical value setting operation unit is provided on a touch panel display, the input confirmation key and the correction key may be virtually provided as well.

Furthermore, in the above, an example in which a 5-digit numerical value is inputted to a personal computer has been described; however, a numerical value input apparatus having the same configuration may be used for any electric equipment by converting the numerical value into an electric signal and inputting it. In particular, for electric equipment in which an operation of continuously inputting numerical values is performed, by using the numerical value input apparatus described above, quick input of the abacus method may be performed without uncertainty. At this time, in the above example, a 5-digit numerical value is used, however the number of digits is arbitrary, but when the number of digits is small, it is particularly possible to perform input quickly.

In addition, in the above example, a decimal number having a plurality of digits is presumed to be inputted by the numerical value input apparatus using the abacus method; however even in a case of a numerical value in another format, as long as the numerical value is represented by a plurality of digits, a similar configuration may be used. In this case, as the method of expression a method other than the abacus method may be appropriately used.

Furthermore, in the above example, a case of converting a numerical value into an electric signal and inputting the electric signal into an electric apparatus is described; however, in a case of using encoded characters (Japanese characters, alphabet characters, and the like) numerical values and characters may be made to correspond one to one. In this case, by setting and confirming a numerical value as described above, and converting the confirmed numerical value into a character, the numerical value input apparatus described above may be used as a part of a character input apparatus.

The invention claimed is:

1. A numerical value input apparatus comprising
an operation input unit that uses in combination a plurality of numerical value setting operation units in which two states are set for each; a number is represented by a combination of the states of the plurality of numerical value setting operation units so that 0 is represented in a case in which each of the plurality of numerical value setting operation units is in an initial state, and by providing a plurality of the numerical value setting operation units for each digit, numerical values of a plurality of digits are expressed; with each of the plurality of numerical value setting operation units being biased to a side that is the initial state; and also comprising a signal generation unit that, in a case in which an input confirmation key provided separately from the numerical value setting operation units is operated, confirms a numerical value that reflects the state of the numerical value setting operation units for each digit when the input confirmation key is operated, and coverts the numerical value into an electric signal; wherein the signal generation unit, in a state in which the input confirmation key is not operated, and in a case in which after at least one of the numerical value setting operation units is operated to change from the initial state, and after a state in which the numerical value is set without the numerical value setting operation unit being changed from the initial state in a digit of a higher order than the digit in which the numeric value setting operation unit is provided, one of the numerical value setting operation units is newly operated in the higher order digit and changed from the initial state, performs a second confirmation operation for confirming the numerical value reflecting the state of the numerical value setting operation unit of each digit before the operation.

2. The numerical value input apparatus according to claim 1, wherein the signal generation unit, in a state in which the input confirmation key is not operated, and in a case in which an operation is performed to change any one of the numerical value setting operation units of the least significant digit from the initial state, performs a first confirmation operation for confirming the numerical value reflecting the state of the numerical value setting operation unit of each digit after the operation.

3. A numerical value input apparatus comprising an operation input unit that uses in combination a plurality of numerical value setting operation units in which two states are set for each; a number is represented by a combination of the states of the plurality of numerical value setting operation units so that 0 is represented in a case in which each of the plurality of numerical value setting operation units is in an initial state, and by providing a plurality of the numerical value setting operation units for each digit, numerical values of a plurality of digits are expressed; with each of the plurality of numerical value setting operation units being biased to a side that is the initial state; and also comprising a signal generation unit that, in a case in which an input confirmation key provided separately from the numerical value setting operation units is operated, confirms a numerical value that reflects the state of the numerical value setting operation units for each digit when the input confirmation key is operated, and coverts the numerical value into an electric signal, wherein the signal generation unit, in a state in which the input confirmation key is not operated, and in a case in which after a state in which the numerical value is set by changing from the initial state by operating at least one of the numerical value setting operation units, and an operation is performed to further change the state of the numerical value setting operation unit at the digit to which the operated numerical value setting operation unit belongs, performs a third confirmation operation for confirming the numerical value reflecting the state of the numerical value setting operation unit of each digit before the operation.

4. The numerical value input apparatus according to claim 3, wherein
in a case in which a correction key provided separately from the numerical value setting operation unit and the input confirmation key, is operated, the third confirmation operation is not performed.

5. The numerical value input apparatus according to claim 1, wherein
the signal generation unit, in a state in which the input confirmation key is not operated, and
in a case in which the state is changed from the initial state by operating at least one of the numerical value setting operation units, and when the state in which the amount of time that the numerical setting operation unit is fixed and maintained in the changed state from the initial state is longer than a preset threshold value, performs a fourth confirmation operation for confirming the numerical value that reflects the state of the numerical value setting operation unit of each digit at the time of the operation.

6. The numerical value input apparatus according to claim 1, wherein
in the operation input unit, five numerical value setting operation units are provided for each digit, and numbers from 0 to 9 are expressed in an abacus method by combinations of states of the five numerical value setting operation units.

7. A character input apparatus that converts the numerical values confirmed by the numerical value input apparatus according to claim 1 into characters corresponding to Japanese characters or alphabet characters.

\* \* \* \* \*